(No Model.)

R. H. EWING.
CULTIVATOR.

No. 310,806. Patented Jan. 13, 1885.

Witnesses.
A. Ruppert
R. J. Shuhy

Inventor:
Reuben H. Ewing
Per
Thomas P. Simpson
Attorney

UNITED STATES PATENT OFFICE.

REUBEN HOLCOMB EWING, OF PROMISE CITY, ASSIGNOR OF ONE-HALF TO JOSEPH A. WOLFINGER AND WM. J. WOLFINGER, OF WAYNE COUNTY, IOWA.

CULTIVATOR.

SPECIFICATION forming part of Letters Patent No. 310,806, dated January 13, 1885.

Application filed September 6, 1884. (No model.)

*To all whom it may concern:*

Be it known that I, REUBEN H. EWING, residing at Promise City, in the county of Wayne and State of Iowa, have invented an Improved Break-Pin Cultivator, of which the following is a specification.

The special object of the invention is to avoid the trouble, vexation, and loss of time incident to the replacement of broken pins, where the soil is cumbered with stones, stumps, or roots. I attain this object by making the break-pin supply automatic, so that the farmer may arrange sufficient pins in a position to take the place of all pins likely to break during a morning or afternoon spell of plowing.

Figure 1:
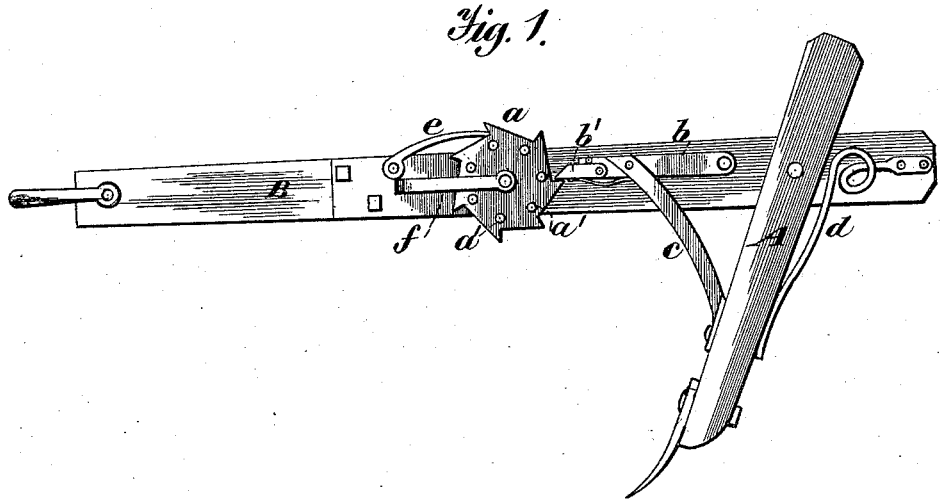
Figure 2:
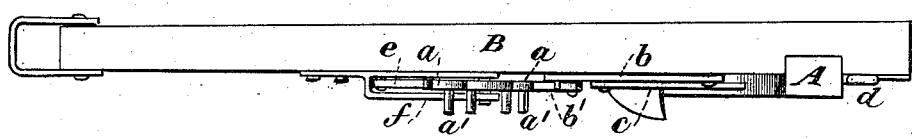

Figure 1 of the drawings is a side elevation showing the desired local relation of the parts to each other. Fig. 2 is a plan view showing the form of the loop-bar, its pivot for the wheel, and how the wheel may rotate within the loop-bar.

In the drawings, A represents the standard which carries the plow or cultivator iron, and is pivoted to the beam B in the usual manner, on one side, in a slot thereof, or in a keeper.

*a* represents a wheel having ratchet-teeth on its periphery, and on an interior circle thereof correspondingly-arranged pin-holes $a'$.

*b* is a pawl, pivoted at its rear end to the plow-beam B, and connected by a strap or brace, *c*, with the standard A. The pawl connects with the brace by a pivot, which must describe an arc from the center of motion of both the pawl and the standard, and as these two arcs will slightly vary the brace-pivot must have sufficient play to allow for this variation.

*b'* is a spring-latch on the end of pawl. *d* is the spring placed in the rear of the standard and attached to the beam so as to throw the standard back to its normal position after the plow or cultivator has been lifted clear of the stump or other obstruction.

*e* is a spring or gravity detent, which may be employed to hold the wheel so that it cannot turn in a backward direction.

*f* represents a loop-bar, of iron or other material. This has at its rear end a cross-pivot, on which the wheel turns, and passes through the loop as it rotates. A wooden peg bears always upon this iron until a sufficient strain on the standard is caused by a root or other obstacle to break a pin. The wheel is then carried forward to the next tooth, and the next wooden pin is held by the detent up to the loop-iron *f*. The operator lifts the plow clear of the obstacle, and the spring *d* throws the standard back into working position, the spring-latch yielding as it presses on the return movement against the newly-advanced tooth until it springs back of said tooth. Where a gang of plows or cultivators are employed on the same frame, my invention is applied to each of them separately.

In an experimental and practical trial of my invention I have found it to be a great convenience as well as an economizer of labor.

Having thus described all that is necessary to a full understanding of my invention, what I claim as new, and desire to protect by Letters Patent, is—

1. In break-pin plows or cultivators, a ratchet-wheel having a pin-hole for each tooth, and adapted to bring forward a fresh pin in place of a broken one, substantially as described.

2. The combination, with a plow or cultivator beam and standard, of a beam-pawl, a ratchet having pin-holes, a loop-bar on the beam, and a strap connecting said pawl with the standard, whereby pins may be automatically supplied as others are broken, substantially in the manner and for the purpose specified.

REUBEN HOLCOMB EWING.

Witnesses:
W. H. BABBITT,
G. W. STANLEY.